(12) United States Patent
Kessel et al.

(10) Patent No.: US 10,989,350 B2
(45) Date of Patent: Apr. 27, 2021

(54) FASTENER HAVING A FLEXIBLE SLEEVE FOR CONNECTING A COATED CONDUIT TO A FITTING

(71) Applicant: Robroy Industries—Texas, LLC, Gilmer, TX (US)

(72) Inventors: Amanda Lynn Kessel, Tyler, TX (US); Christopher M. Caldwell, Longview, TX (US)

(73) Assignee: Robroy Industries—Texas, LLC

( * ) Notice: Subject to any disclaimer, the term of this patent is extended or adjusted under 35 U.S.C. 154(b) by 454 days.

(21) Appl. No.: 15/895,598

(22) Filed: Feb. 13, 2018

(65) Prior Publication Data

US 2018/0231156 A1 Aug. 16, 2018

Related U.S. Application Data

(60) Provisional application No. 62/459,917, filed on Feb. 16, 2017.

(51) Int. Cl.
| | |
|---|---|
| *F16L 58/18* | (2006.01) |
| *F16B 39/12* | (2006.01) |
| *F16B 33/00* | (2006.01) |
| *F16L 15/08* | (2006.01) |

(52) U.S. Cl.
CPC ........... *F16L 58/184* (2013.01); *F16L 58/182* (2013.01); *F16B 33/004* (2013.01); *F16B 39/12* (2013.01); *F16L 15/08* (2013.01)

(58) Field of Classification Search
CPC ....... F16L 15/08; F16L 58/182; F16L 58/184; F16B 33/004; F16B 37/145

USPC .................................. 285/55, 390; 138/96 T
See application file for complete search history.

(56) References Cited

U.S. PATENT DOCUMENTS

| | | | | |
|---|---|---|---|---|
| 3,266,821 | A * | 8/1966 | Safford | ........................... 285/55 |
| 4,296,950 | A * | 10/1981 | Chamberlin | .......... F16L 58/184 |
| 5,406,983 | A * | 4/1995 | Chambers | ............. F16L 58/182 |
| 7,527,302 | B2 * | 5/2009 | Lewis | |
| 2005/0173919 | A1 * | 8/2005 | Posson | .................... F16L 15/08 |
| | | | | 285/55 |
| 2010/0183363 | A1 | 7/2010 | Bartholoma et al. | |
| 2018/0023749 | A1 * | 1/2018 | Ludwig | ...................... 138/96 T |

FOREIGN PATENT DOCUMENTS

| | | |
|---|---|---|
| CA | 2621585 A1 | 8/2008 |
| EP | 2424057 A1 | 2/2012 |
| EP | 2913574 A1 | 2/2015 |
| GB | 2483237 A | 3/2012 |

* cited by examiner

*Primary Examiner* — Zachary T Dragicevich
(74) *Attorney, Agent, or Firm* — The Webb Law Firm (57) ABSTRACT

A fastener for connecting a coated conduit to a fitting comprises: a locking nut having a first end, a second end, and internal threading extending between the first end and the second end; a gasket formed at the first end of the locking nut by coating the locking nut with a polymeric material; and a flexible sleeve extending from the second end of the locking nut that is formed by coating the locking nut with the polymeric material. The internal threading of the locking nut is threaded onto exposed threading of the coated conduit such that the flexible sleeve fits over a circumference of the coated conduit and the gasket forms a sealed connection with the fitting when the exposed threading of the coated conduit is connected to the fitting.

14 Claims, 7 Drawing Sheets

| Metric Size Designators | Pipe Size (Inches) | Catalog Number | A | B | C | Nominal Weight |
|---|---|---|---|---|---|---|
| 16 | 1/2" | PBSIB101 | 1.375 | 1.250 | 0.250 | 0.03 |
| 21 | 3/4" | PBSIB102 | 1.625 | 1.250 | 0.250 | 0.04 |
| 27 | 1" | PBSIB103 | 1.940 | 1.250 | 0.250 | 0.06 |
| 35 | 1-1/4" | PBSIB104 | 2.375 | 1.250 | 0.250 | 0.08 |
| 41 | 1-1/2" | PBSIB105 | 2.625 | 1.563 | 0.313 | 0.11 |
| 41 | 1-1/2" | PBSIB106 | 2.625 | 1.563 | 0.313 | 0.11 |
| 63 | 2-1/2" | PBSIB107 | 3.750 | 1.813 | 0.313 | 0.18 |
| 78 | 3" | PBSIB108 | 4.500 | 1.875 | 0.375 | 0.22 |
| 91 | 3-1/2" | PBSIB109 | 5.000 | 2.250 | 0.375 | 0.30 |
| 103 | 4" | PBSIB110 | 5.500 | 2.250 | 0.375 | 0.38 |
| 129 | 5" | PBSIB111 | 6.000 | 2.375 | 0.500 | 0.54 |
| 155 | 6" | PBSIB112 | 6.500 | 2.375 | 0.500 | 0.70 |

FASTENER HAVING A FLEXIBLE SLEEVE FOR CONNECTING A COATED CONDUIT TO A FITTING

CROSS REFERENCE TO RELATED APPLICATIONS

This application claims priority to U.S. Provisional Patent Application Ser. No. 62/459,917, entitled "Fastener Having a Flexible Sleeve for Connecting a Coated Conduit to a Fitting", filed Feb. 16, 2017, the contents of which are incorporated herein by reference.

BACKGROUND OF THE INVENTION

Field of the Invention

The present disclosure is generally directed to a fastener for connecting a coated conduit to a fitting and, more specifically, to a coated fastener having a flexible sleeve.

Description of Related Art

The primary function of a PVC-coated conduit system is to maximize the life of the electrical system contained within it and to prevent corrosion from sabotaging its structural integrity. This is achieved through PVC coating adhered to the external surface of the system, preventing exposure to external environmental conditions that could result in corrosion of the steel or aluminum system underneath, and an internal urethane coating that prevents corrosion from atmospheric conditions that could compromise the system from within.

Figure 1A:
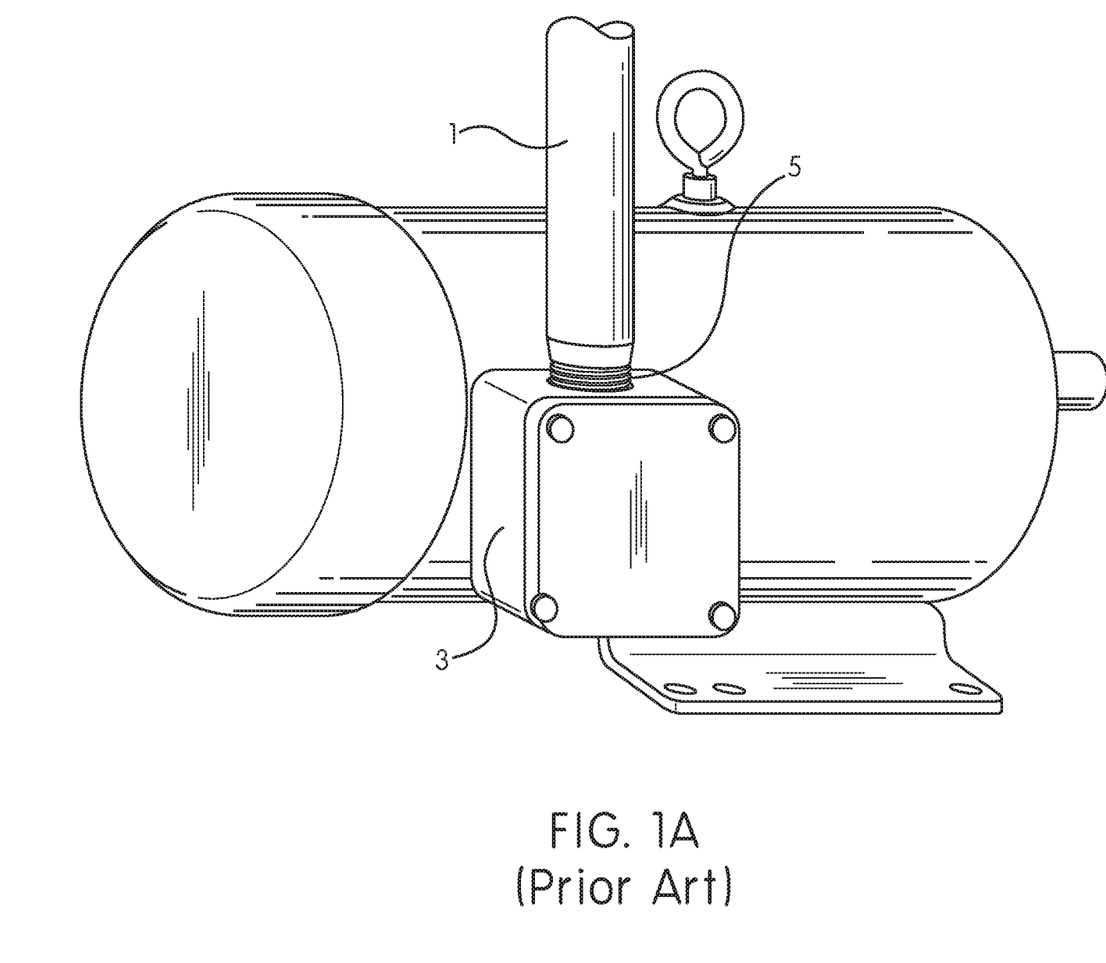
FIG. 1A is a perspective view of a conventional coated conduit connected to an outlet box.
Figure 1B:
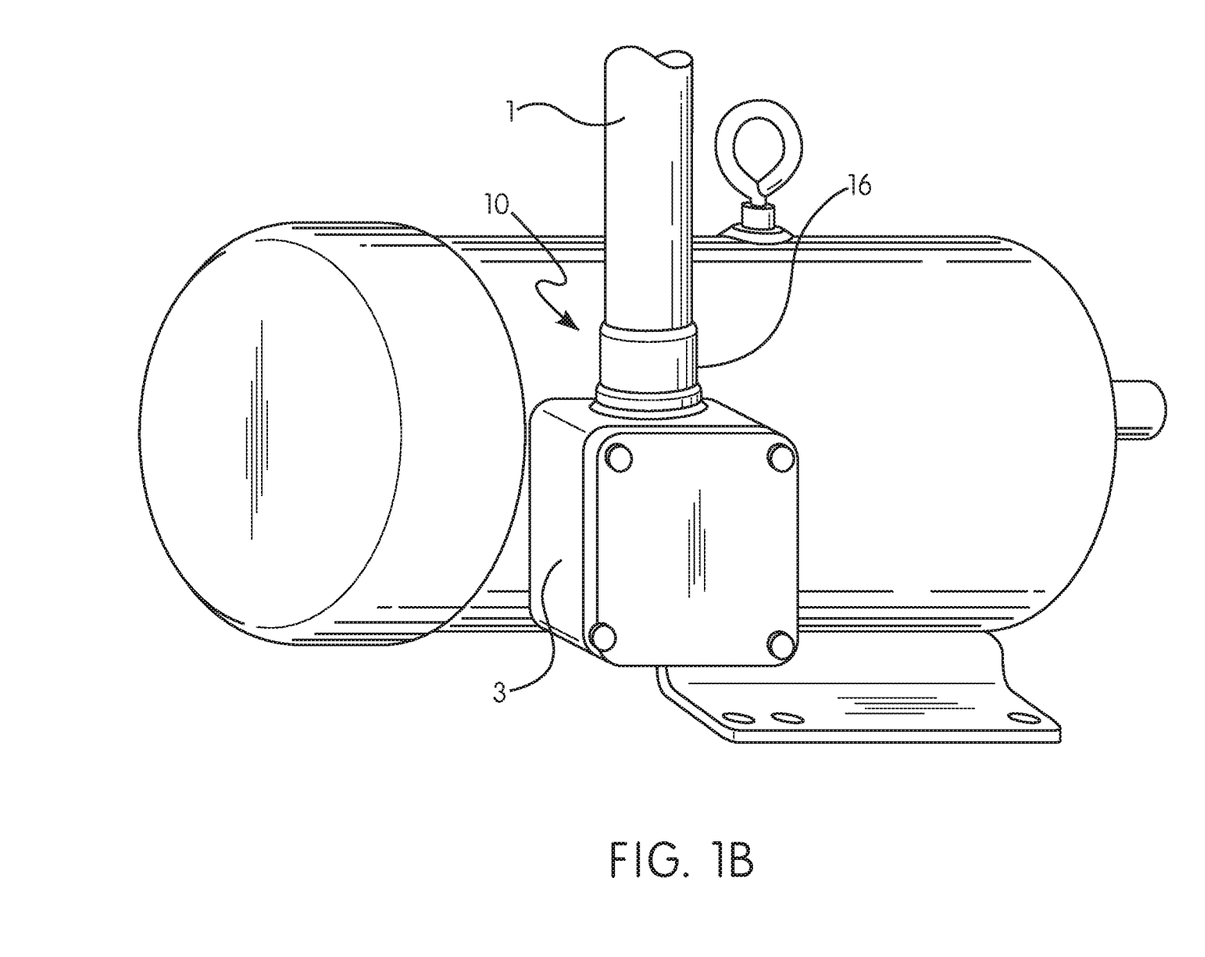
FIG. 1B is a perspective view of a coated conduit connected to an outlet box utilizing a fastener in accordance with the present disclosure.
Figure 2A:
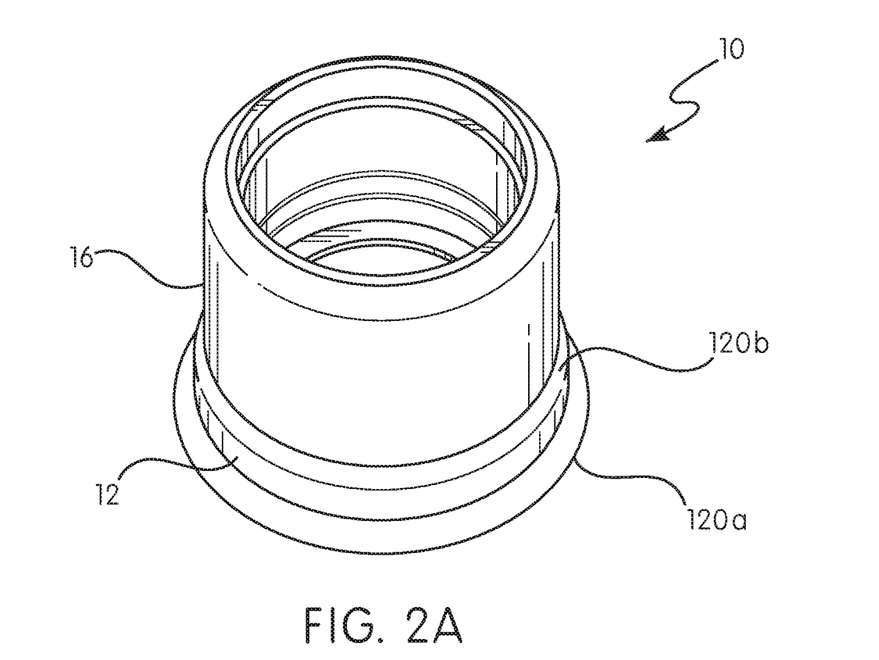
FIGS. 2A and 2B are bottom and top perspective views of the fastener in accordance with the present disclosure.
Figure 2B:
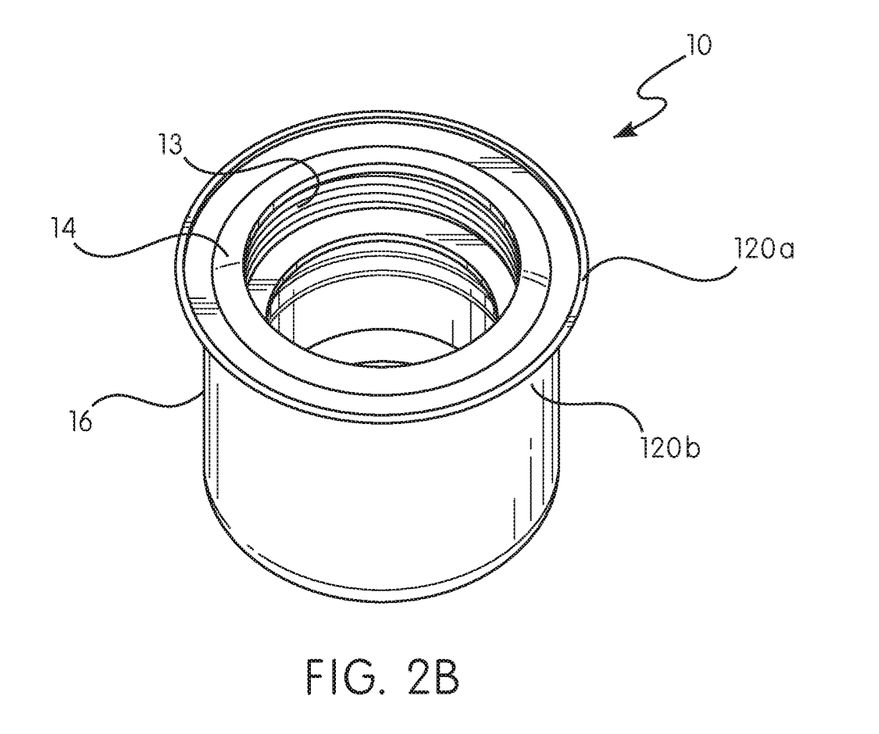

However, a system is only as strong as its weakest link. Connections and joints in particular are locations that offer an opportunity for corrosive agents to invade a structure by allowing exposure of uncoated sections of its components. One of the most common exposures occurs at the threads of conduit connections into outlet boxes, conduit bodies, and other fittings. More specifically, and with reference to FIG. 1, when a coated conduit 1 is connected to a fitting 3, such as an outlet box, a portion of the uncoated threads 5, made from steel or aluminum, of the coated conduit 1 remain exposed to the environment when the coated conduit 1 is properly connected to the outlet box 3. Raw exposed steel and aluminum threads provide a location for moisture in the air to condense and result in crevice corrosion and pitting between the protective coatings.

A variety of solutions exist to prevent the exposure of conduit threads at joints. For example, manufacturers of PVC-coated systems design fittings to provide uniform protection from the external environment at joints. However, such currently available systems suffer from various deficiencies and do not adequately protect the exposed threading of the coated conduit.

SUMMARY OF THE INVENTION

In order to prevent the exposure of threads, a simple, detachable sleeve has been developed to provide a consistent seal over the exposed threads of conduit tips at connections. Specifically, the present disclosure provides a fastener for connecting a coated conduit to a fitting. The fastener comprises: a locking nut having a first end, a second end, and internal threading extending between the first end and the second end; a gasket formed at the first end of the locking nut by coating the locking nut with a polymeric material; and a flexible sleeve extending from the second end of the locking nut that is formed by coating the locking nut with the polymeric material. The internal threading of the locking nut is threaded onto exposed threading of the coated conduit such that the flexible sleeve fits over a circumference of the coated conduit and the gasket forms a sealed connection with the fitting when the exposed threading of the coated conduit is connected to the fitting.

The polymeric material may be polyvinyl chloride or any other suitable polymeric material. The locking nut may be provided with a thin profile to allow the locking nut to be threaded on 1.5 to 2.5 exposed threads of the coated conduit. The locking nut may be manufactured from steel, aluminum, or any other suitable material.

The present disclosure also provides a conduit system comprising: a conduit comprising a cylindrical body with a first end comprising threads; and a fastener. The fastener comprises: a locking nut having a first end, a second end, and internal threading extending between the first end and the second end; a gasket formed at the first end of the locking nut by coating the locking nut with a polymeric material; and a flexible sleeve extending from the second end of the locking nut that is formed by coating the locking nut with the polymeric material. The internal threading of the locking nut is threaded onto the threads of the conduit such that the flexible sleeve fits over a circumference of the conduit and the gasket forms a sealed connection with a fitting when the threads of the conduit are connected to the fitting.

The conduit may be a coated conduit with the cylindrical body coated with a polymeric material and the threads are exposed.

The present disclosure further provides a method of connecting a conduit to a fitting. The method comprises: providing a fastener comprising: a locking nut having a first end, a second end, and internal threading extending between the first end and the second end; a gasket formed at the first end of the locking nut by coating the locking nut with a polymeric material; and a flexible sleeve extending from the second end of the locking nut that is formed by coating the locking nut with the polymeric material; threading the internal threading of the locking nut onto exposed threading of the coated conduit such that the flexible sleeve fits over a circumference of the coated conduit; and threading the exposed threading of the coated conduit onto a fitting such that the gasket forms a sealed connection with the fitting.

These and other features and characteristics of the device of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the device of the present disclosure. As used in the specification and the claims, the singular form of "a", "an", and "the" include plural referents unless the context clearly dictates otherwise.

DESCRIPTION OF THE INVENTION

For purposes of the description hereinafter, terms such as "upper", "lower", "right", "left", "vertical", "horizontal", "top", "bottom", "lateral", "longitudinal", and derivatives thereof, shall relate to the device of the present disclosure as it is oriented in the drawing figures. However, it is to be understood that the device of the present disclosure may assume various alternative variations, except where expressly specified to the contrary. It is also to be understood that the specific devices illustrated in the attached drawings, and described in the following specification, are simply exemplary embodiments of the device of the present disclosure. Hence, specific dimensions and other physical characteristics related to the embodiments disclosed herein are not to be considered as limiting.

With reference to FIGS. 1B, 2A, 2B, 3A, and 3B, a fastener 10 for connecting a coated conduit 1 to a fitting 3 comprises: a locking nut 12 having a first end 120a, a second end 120b, and internal threading 13 extending between the first end 120a and the second end 120b; a gasket 14 formed at the first end 120a of the locking nut 12 by coating the locking nut 12 with a polymeric material; and a flexible sleeve 16 extending from the second end 120b of the locking nut 12 that is formed by coating the locking nut 12 with the polymeric material.

The built-in gasket 14 at the first end 120a of the locking nut 12 provides a positive seal against water, oils, and other liquids against the hub of a connected fitting 3. On the second end 120b of the locking nut 12, the flexible and integral sleeve 16 is designed to fit securely over the circumference of the adjacent coated conduit 1.

The fastener 10 is manufactured by providing a locking nut 12 manufactured from steel or aluminum. However, this is not to be construed as limiting the present disclosure as any suitable material may be used to form the locking nut 12, such as other metallic materials and hard polymeric materials. In one example, the locking nut 12 is provided with a thin profile (e.g., a width of 0.0625 inches or less) to allow the locking nut 12 to be threaded on 1.5 to 2.5 exposed threads of the coated conduit. To begin the manufacturing process, the locking nut 12 is primed with a primer so that the polymeric material adheres thereto and is placed within tooling such that the polymeric material is formed into the gasket 14 and sleeve 16. The polymeric material is a specially formulated and UL-recognized polyvinyl chloride material, tested for aging-resistant compressive and tensile properties. This ensures that the gasket 14 and sleeve 16 will retain their sealing and corrosion-resistant capabilities throughout their service life. However, this is not to be construed as limiting the present disclosure as any suitable polymeric material may be used to form the gasket 14 and the sleeve 16. Thereafter, the entire device is cured and then released from the tooling. The extra thin construction of the locking nut and gasket allows it to thread onto no more than 2.5 threads of the coated conduit 1 leaving at least five threads for complete engagement of the conduit 1 to its connected fitting 3 for safe installation.

Figure 3A:
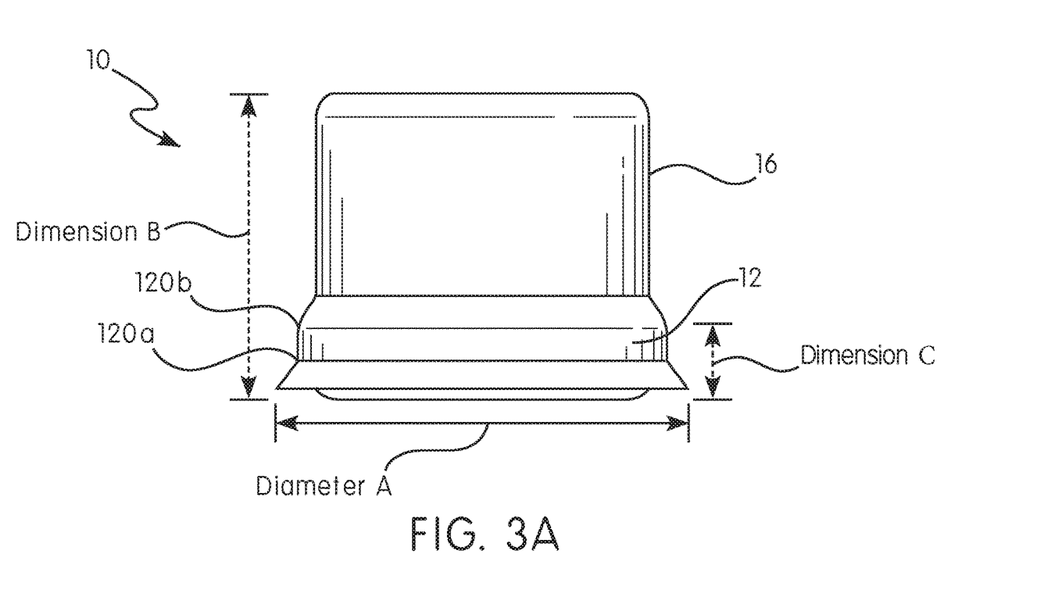
FIGS. 3A and 3B are side and bottom views of the fastener in accordance with the present disclosure.
Figure 3B:
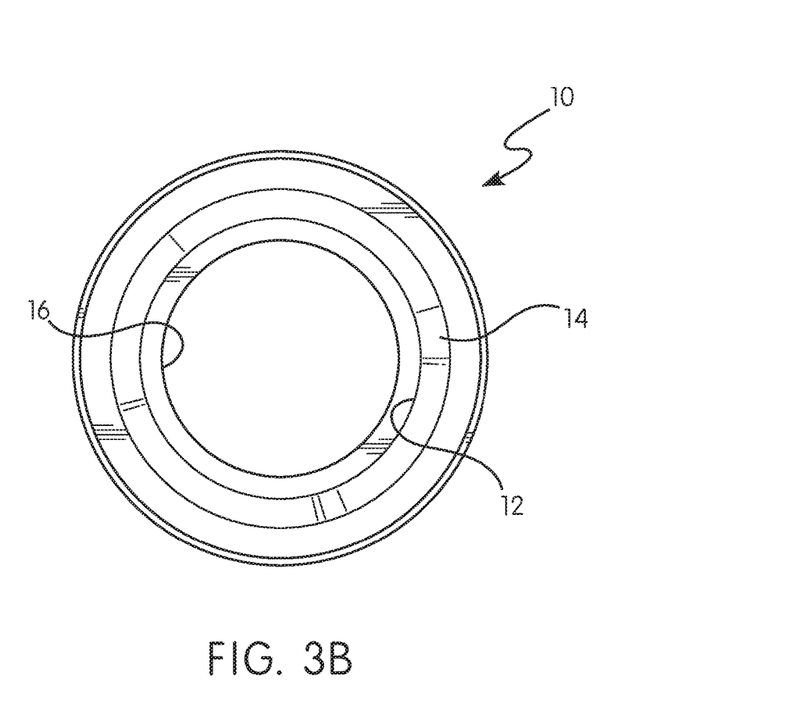
Figure 4:
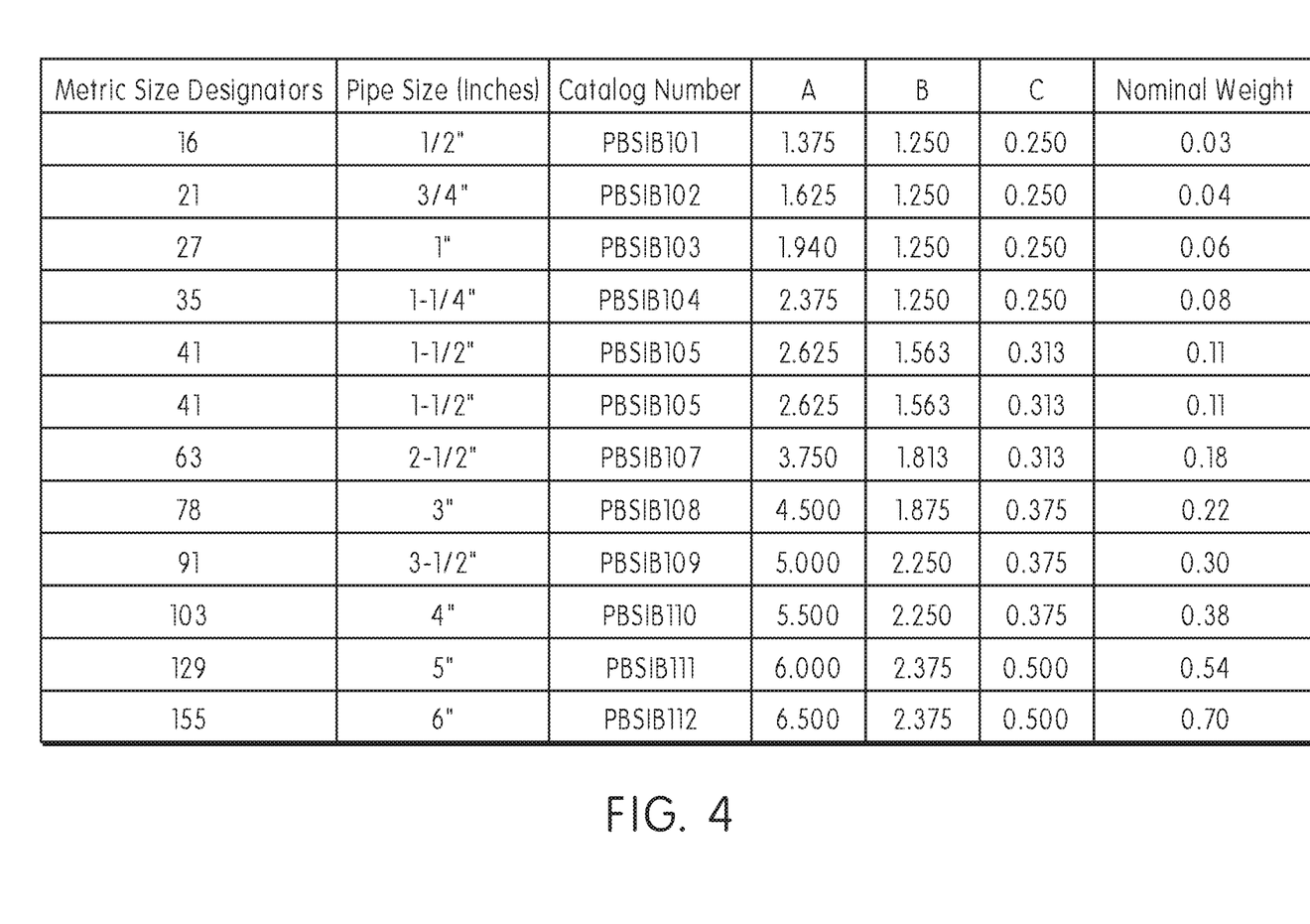
FIG. 4 is a table providing different sizes for the fastener of FIG. 3.

With reference to FIG. 4, the fastener 10 may be manufactured in a variety of different sizes to accommodate a variety of different sizes of conduits and fittings. The sizes for Diameter A, Dimension B, and Dimension C shown in FIG. 3 for various sizes of fastener 10 are provided in inches in columns A, B, and C of the table in FIG. 4. Please note that the dimensions provided in the table of FIG. 4 are for exemplary purposes only and are not to be construed as limiting the present disclosure as the fastener 10 may be manufactured in any number of sizes.

Figure 5A:
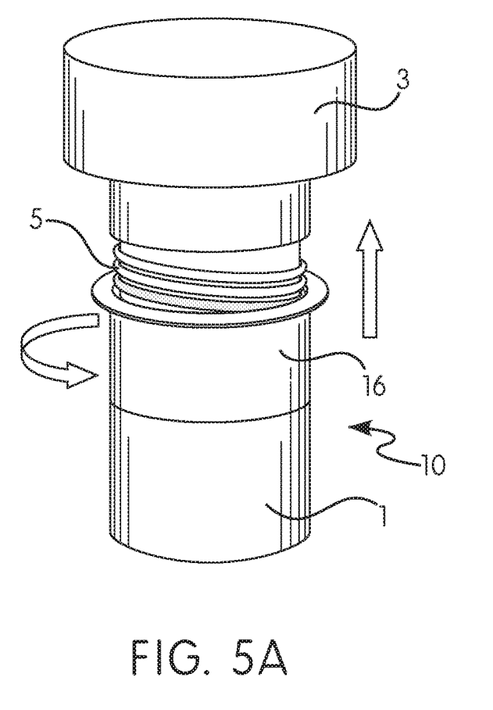
FIGS. 5A and 5B are schematic diagrams of the fastener of the present disclosure coupling a conduit to a fitting.
Figure 5B:
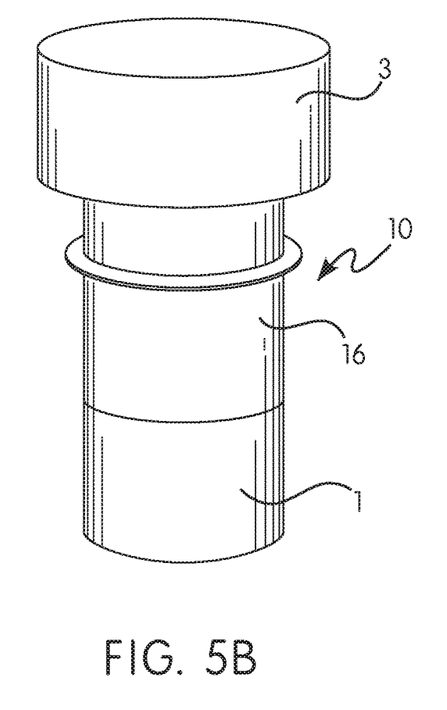
Figure 6A:
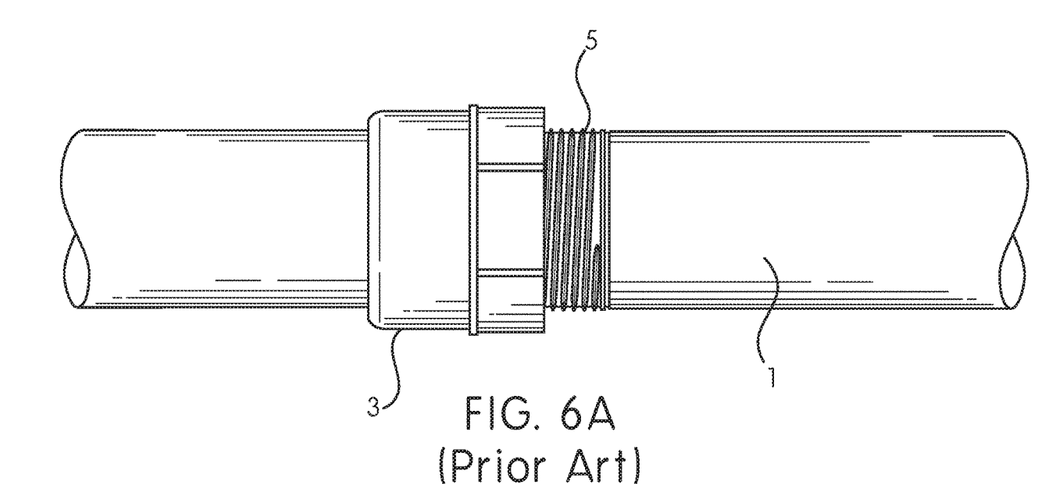
FIG. 6A is a side view of a conventional coated conduit connected to a fitting.
Figure 6B:
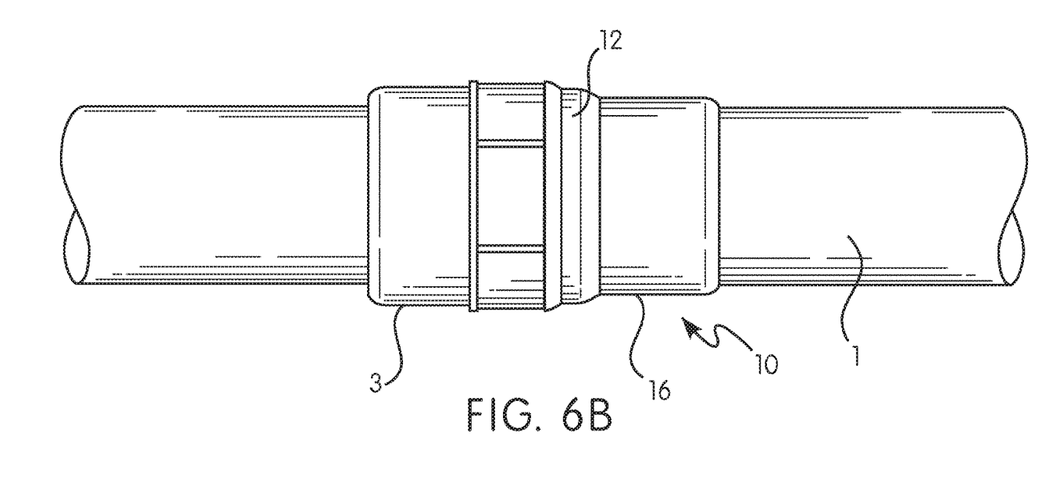
FIG. 6B is a side view of the fastener of the present disclosure connected between a conduit and a fitting.

With reference to FIGS. 5A and 5B, installation of the fastener 10 is as follows. The internal threading 13 of the locking nut 12 is threaded onto the exposed threading 5 of the coated conduit 1 such that the flexible sleeve 16 fits over a circumference of the coated conduit 1. The gasket 14 then forms a sealed connection with the fitting 3 when the exposed threading 5 of the coated conduit 1 is connected to the fitting 3. Accordingly, the design of the fastener 10 allows for easy installation and tightening over conduit threads 5 at joints throughout the system. The only tools required for tightening include a strap-wrench and lube to assist the sleeve 16 over the coated conduit 1. In addition, as clearly shown by comparing FIG. 6B with prior art FIG. 6A, the fastener 10 provides a consistent seal over the exposed threads 5 of the conduit tips at connections.

While specific embodiments of the device of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. A fastener for connecting a coated conduit to a fitting comprising:
    a locking nut having a first end, a second end, and internal threading extending between the first end and the second end; and
    polymeric material coating and surrounding an external surface of the locking nut, the polymeric material comprising:
        a gasket formed from the polymeric material at the first end of the locking nut;
        a central portion integrally formed with the gasket by coating the locking nut with the polymeric material; and
        a flexible sleeve integrally formed with the gasket portion and the central portion from the polymeric material and extending from the second end of the locking nut,
    wherein the internal threading of the locking nut is configured to be threaded onto exposed threading of the coated conduit such that the flexible sleeve fits over a circumference of the coated conduit and the gasket is positioned between the first end of the locking nut and the fitting to form a sealed connection with the fitting when the exposed threading of the coated conduit is connected to the fitting.

2. The fastener of claim 1, wherein the polymeric material is polyvinyl chloride.

3. The fastener of claim 1, wherein a profile of the locking nut allows the locking nut to be threaded on 1.5 to 2.5 exposed threads of the coated conduit.

4. The fastener of claim 1, wherein the locking nut is manufactured from steel or aluminum.

5. A conduit system comprising:
   a conduit comprising a cylindrical body with a first end comprising threads; and
   a fastener comprising:
     a locking nut having a first end, a second end, and internal threading extending between the first end and the second end; and
     polymeric material coating and surrounding an external surface of the locking nut, the polymeric material comprising:
       a gasket formed from the polymeric material at the first end of the locking nut;
       a central portion integrally formed with the gasket by coating the locking nut with the polymeric material; and
       a flexible sleeve integrally formed with the gasket portion and the central portion from the polymeric material and extending from the second end of the locking nut,
   wherein the internal threading of the locking nut is threaded onto the threads of the conduit such that the flexible sleeve fits over a circumference of the conduit and the gasket forms is positioned between the first end of the locking nut and the fitting to form a sealed connection with a fitting when the threads of the conduit are connected to the fitting.

6. The conduit system of claim 5, wherein the conduit is a coated conduit.

7. The conduit system of claim 6, wherein the cylindrical body of the coated conduit comprises a polymeric coating and the threads are exposed.

8. The conduit system of claim 5, wherein the polymeric material is polyvinyl chloride.

9. The conduit system of claim 5, wherein a profile of the locking nut allows the locking nut to be threaded on 1.5 to 2.5 exposed threads of the conduit.

10. The conduit system of claim 5, wherein the locking nut is manufactured from steel or aluminum.

11. A method of connecting a coated conduit to a fitting comprising:
    providing a fastener comprising:
      a locking nut having a first end, a second end, and internal threading extending between the first end and the second end; and
      polymeric material coating and surrounding an external surface of the locking nut, the polymeric material comprising:
        a gasket formed from the polymeric material at the first end of the locking nut;
        a central portion integrally formed with the gasket by coating the locking nut with the polymeric material; and
        a flexible sleeve integrally formed with the gasket portion and the central portion from the polymeric material and extending from the second end of the locking nut;
    threading the internal threading of the locking nut onto exposed threading of the coated conduit such that the flexible sleeve fits over a circumference of the coated conduit; and
    threading the exposed threading of the coated conduit onto a fitting such that the gasket is positioned between the first end of the locking nut and the fitting to form a sealed connection with the fitting.

12. The method of claim 11, wherein the polymeric material is polyvinyl chloride.

13. The method of claim 11, wherein a profile of the locking nut allows the locking nut to be threaded on 1.5 to 2.5 exposed threads of the coated conduit.

14. The method of claim 11, wherein the locking nut is manufactured from steel or aluminum.

\* \* \* \* \*

UNITED STATES PATENT AND TRADEMARK OFFICE
CERTIFICATE OF CORRECTION

PATENT NO. : 10,989,350 B2  
APPLICATION NO. : 15/895598  
DATED : April 27, 2021  
INVENTOR(S) : Amanda Lynn Kessel et al.

Page 1 of 1

It is certified that error appears in the above-identified patent and that said Letters Patent is hereby corrected as shown below:

On the Title Page

Column 1, item (73), Assignee, Line 1, after "LLC" insert -- Gilmer (US) --

In the Claims

Column 5, Line 30, Claim 5, after "gasket" delete "forms"

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*